United States Patent
Kleinman et al.

(10) Patent No.: US 9,032,243 B2
(45) Date of Patent: May 12, 2015

(54) TARGET OPERATING SYSTEM AND FILE SYSTEM AGNOSTIC BARE-METAL RESTORE

(75) Inventors: Ami Kleinman, Haifa (IL); Dudi Lester, Haifa (IL); Eran Raichstein, Haifa (IL); Gil Sasson, Haifa (IL); Michael Sternberg, Haifa (IL); Uri Wolloch, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 988 days.

(21) Appl. No.: 12/694,795

(22) Filed: Jan. 27, 2010

(65) Prior Publication Data

US 2011/0185223 A1    Jul. 28, 2011

(51) Int. Cl.
*G06F 11/00*    (2006.01)
*G06F 11/14*    (2006.01)

(52) U.S. Cl.
CPC ........ *G06F 11/1456* (2013.01); *G06F 11/1469* (2013.01)

(58) Field of Classification Search
USPC ........................................ 714/6.12, 6.11, 6.1
See application file for complete search history.

(56) References Cited

U.S. PATENT DOCUMENTS

| | | | |
|---|---|---|---|
| 6,996,672 B2 | 2/2006 | Lubbers et al. | |
| 7,246,221 B1 | 7/2007 | Solitis et al. | |
| 7,334,157 B1 * | 2/2008 | Graf et al. | 714/13 |
| 7,356,679 B1 * | 4/2008 | Le et al. | 713/1 |
| 7,409,511 B2 | 8/2008 | Edwards et al. | |
| 7,496,783 B1 * | 2/2009 | Graf et al. | 714/4.11 |
| 7,552,358 B1 | 6/2009 | Agar et al. | |
| 7,596,713 B2 * | 9/2009 | Mani-Meitav et al. | 714/6.32 |
| 7,600,146 B2 | 10/2009 | Liccione et al. | |
| 8,103,747 B2 * | 1/2012 | Trujillo | 709/220 |
| 8,260,893 B1 * | 9/2012 | Bandhole et al. | 709/223 |
| 8,347,137 B1 * | 1/2013 | Chepel et al. | 714/6.12 |
| 2005/0216788 A1 * | 9/2005 | Mani-Meitav et al. | 714/6 |
| 2006/0020837 A1 * | 1/2006 | Rothman et al. | 713/310 |
| 2007/0220308 A1 | 9/2007 | Yeung et al. | |

(Continued)

FOREIGN PATENT DOCUMENTS

WO    2009085977    7/2009

OTHER PUBLICATIONS

From Wikipedia, The Free Encyclopedia, "Live CD", (http:/en.wikipedia.org/wiki/Live_CD.

(Continued)

*Primary Examiner* — Loan L. T. Truong
(74) *Attorney, Agent, or Firm* — William J. Stock; Gregory K. Goshorn; Greg Goshorn, P.C.

(57) ABSTRACT

A system, method, and computer program product for performing a bare-metal restore, the system including a target storage device, and a target computer configured to boot independent of the target storage device, expose the target storage device to a restoring computer after the target computer has booted, and act as a conduit for the restoring computer to perform a bare-metal restore of backup data onto the target storage device, and the method including booting a target computer independent of a target storage device, exposing the target storage device to a restoring computer after the target computer has booted, and causing the target computer to act as a conduit for the restoring computer to perform a bare-metal restore of backup data onto the target storage device.

17 Claims, 3 Drawing Sheets

(56) References Cited

U.S. PATENT DOCUMENTS

| | | |
|---|---|---|
| 2008/0034021 A1 | 2/2008 | De Spiegeleer |
| 2008/0120403 A1 | 5/2008 | Lowery et al. |
| 2008/0184023 A1 | 7/2008 | Shin |
| 2008/0276123 A1* | 11/2008 | Sudhakar et al. ............... 714/6 |
| 2009/0070626 A1* | 3/2009 | Chen et al. ...................... 714/7 |
| 2009/0193102 A1* | 7/2009 | Trujillo ........................ 709/220 |
| 2009/0222496 A1* | 9/2009 | Liu et al. ...................... 707/204 |
| 2009/0259836 A1* | 10/2009 | Chan et al. ..................... 713/2 |
| 2010/0005337 A1* | 1/2010 | Bensinger ....................... 714/4 |
| 2010/0049750 A1* | 2/2010 | Srivastava et al. .......... 707/202 |
| 2010/0070476 A1* | 3/2010 | O'Keefe et al. ............. 707/640 |
| 2010/0257346 A1* | 10/2010 | Sosnosky et al. ............... 713/2 |
| 2011/0153697 A1* | 6/2011 | Nickolov et al. ............ 707/827 |
| 2011/0173405 A1* | 7/2011 | Grabarnik et al. ........... 711/162 |

OTHER PUBLICATIONS

From Wikipedia, The Tree Encyclopedia, "iSCSI", (http://en.wikipedia.org/wiki/ISCSI.

Jin Ren, "A Case for Continuous Data Protection at block Level in Disk Array Storages", IEEE Transactions on Parallel and Distributed Systems, vol. 20, No. 6, Jun. 2009, p. 898-911.

* cited by examiner

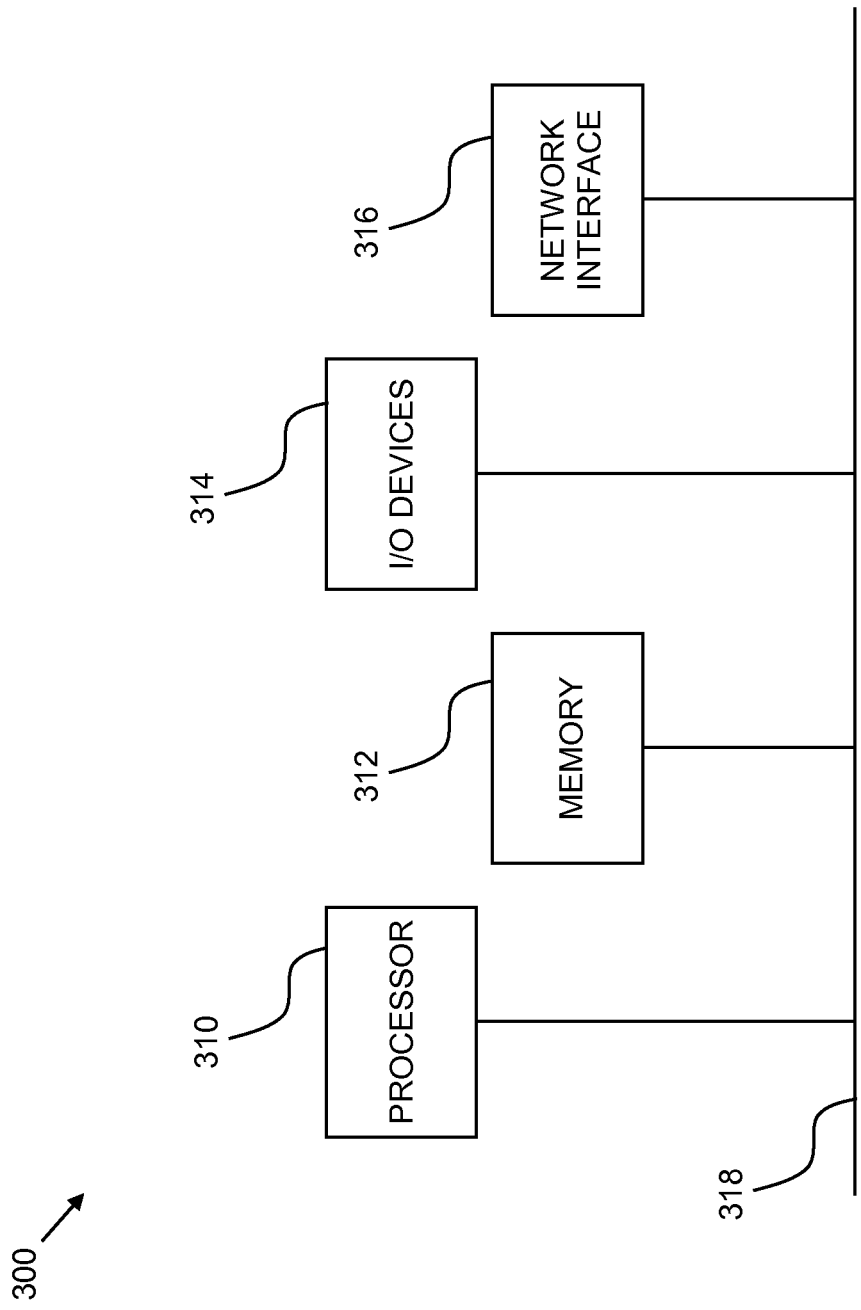

US 9,032,243 B2

TARGET OPERATING SYSTEM AND FILE SYSTEM AGNOSTIC BARE-METAL RESTORE

FIELD OF THE INVENTION

The present invention relates to restoring backup data onto computer data storage devices.

BACKGROUND OF THE INVENTION

Modern computer data backup solutions allow for secondary data storage devices, such as hard disks, to be backed up at the block level, where instead of reading file after file from a secondary data storage device and writing the files to a backup data storage repository, blocks of raw data at either the disk or volume level are read from the secondary data storage device without regard to file boundaries and are written as blocks to the backup data storage repository in the same physical sequence as the blocks appear on the secondary data storage device. One technique for restoring block-level backup data, commonly referred to as a "bare-metal restore" (BMR), allows backup data to be restored to a secondary data storage device of a computer, where the restoration begins when the secondary data storage device is in a "bare metal" state, where no operating system or file system is stored on the secondary data storage device, and ends when the computer and its secondary data storage device are production-ready. Current BMR techniques require that a computer to which the secondary data storage device is attached boot using a bootable image loaded from a bootable CD or USB device or loaded over a network (e.g., PXE boot). These BMR techniques require that the computer boot to a secondary operating system (OS), which is either a standard OS including proprietary restore software, or a dedicated proprietary backup restore application, and require that the restore software be specifically configured to work with the secondary OS and its file system as well.

SUMMARY OF THE INVENTION

In one aspect of the invention a system is provided for performing a bare-metal restore, the system including a target storage device, and a target computer configured to boot independent of the target storage device, expose the target storage device to a restoring computer after the target computer has booted, and act as a conduit for the restoring computer to perform a bare-metal restore of backup data onto the target storage device.

In another aspect of the invention a method is provided for performing a bare-metal restore, the method including booting a target computer independent of a target storage device, exposing the target storage device to a restoring computer after the target computer has booted, and causing the target computer to act as a conduit for the restoring computer to perform a bare-metal restore of backup data onto the target storage device. A computer program product for performing the bare-metal restore is also provided.

BRIEF DESCRIPTION OF THE DRAWINGS

The invention will be understood and appreciated more fully from the following detailed description taken in conjunction with the appended drawings in which:

FIG. 3 is a simplified block diagram illustration of an exemplary hardware implementation of a computing system, constructed and operative in accordance with an embodiment of the invention.

DETAILED DESCRIPTION OF THE INVENTION

Figure 1:
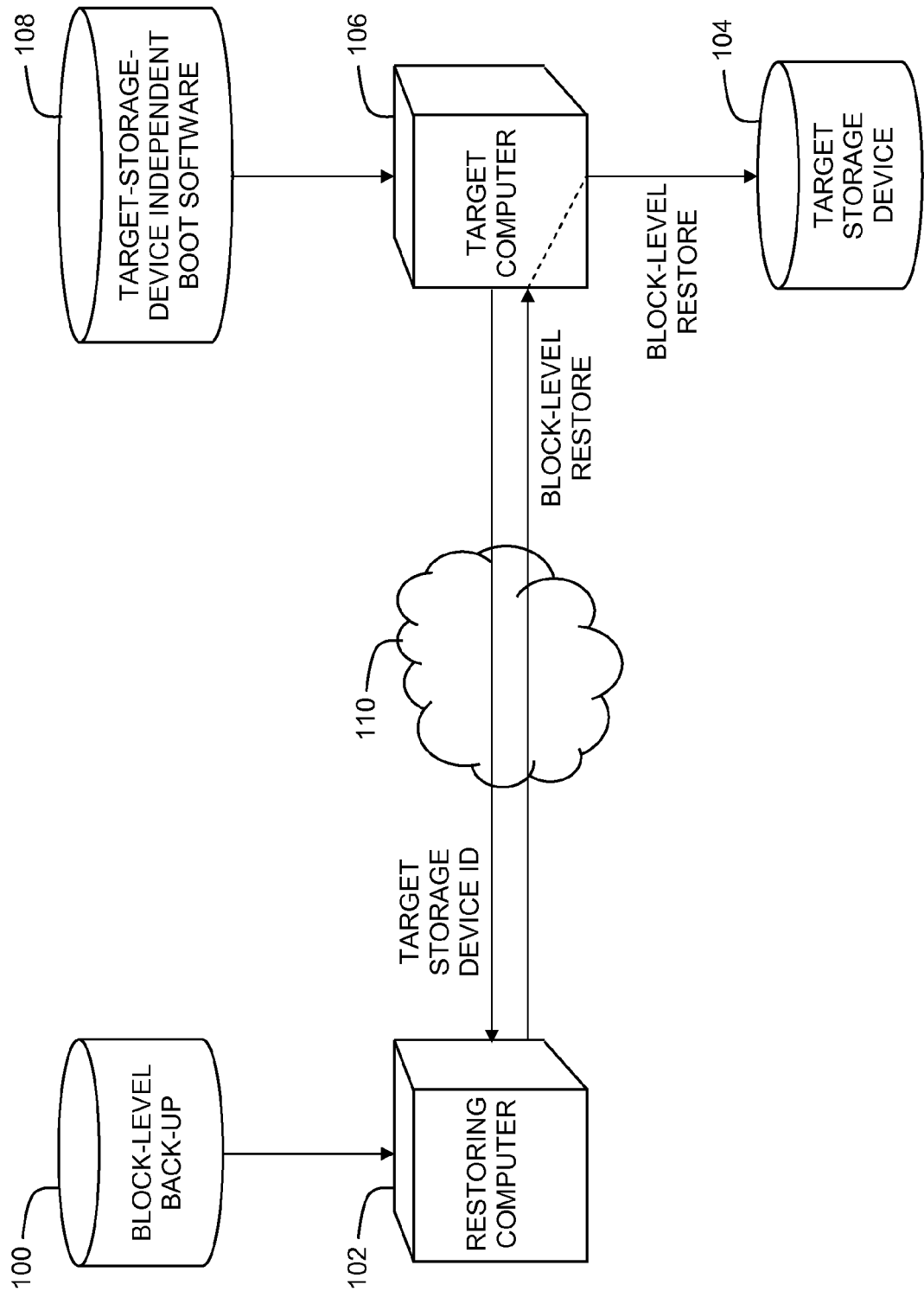
FIG. 1 is a simplified conceptual illustration of a system for performing a target operating system/file system agnostic bare-metal restore, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a system for performing a target operating system/file system agnostic bare-metal restore, constructed and operative in accordance with an embodiment of the invention. In the system of FIG. 1, a block-level backup 100 of a data storage device is restored by a restoring computer 102 to a target data storage device 104 that is physically attached to a target computer 106 and that is known to be compatible with block-level backup 100. To accomplish this, target computer 106 preferably boots using boot software 108 in a manner such that target computer 106 is able to boot whether or not it is connected to target storage device 104. For example, target computer 106 may boot using a "Live CD" or "Live USB Flash Drive" that contains an operating system that is configured to run on a computer lacking mutable secondary storage. Target computer 106 then exposes target storage device 104 to restoring computer 102, such as by designating target storage device 104 as an Internet Small Computer System Interface (iSCSI) target using iSCSI software included with or as part of the boot software, or by using software that supports other protocols such as Fiber Channel Over IP (FCIP) or Internet Fiber Channel Protocol (iFCP), and providing to restoring computer 102 an identifier, such as a Logical Unit Number (LUN), that identifies target storage device 104. Restoring computer 102 then connects with target storage device 104 via target computer 106, such as by employing iSCSI initiator software where target storage device 104 is designated as an iSCSI target or by employing other software compatible with the type of exposure of target storage device 104, and performs a block-level restore of block-level backup 100 onto target storage device 104, such as via a computer network 110.

It will be appreciated that restoring computer 102 may restore block-level backup 100 to target storage device 104 without regard to which type of operating system or file system is employed by target computer 106 when booting using boot software 108. Conversely, it will be appreciated that target computer 106 and target storage device 104 may facilitate the block-level restore of block-level backup 100 onto target storage device 104 without regard to which type of operating system or file system is employed by restoring computer 102.

Figure 2:
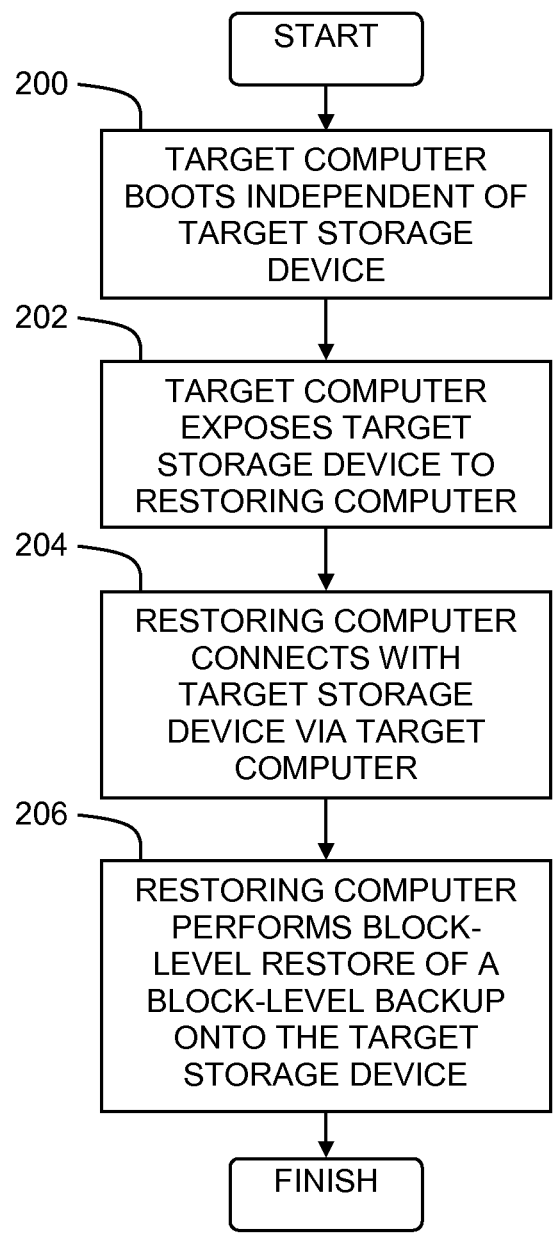
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIG. 1, operative in accordance with an embodiment of the invention. In the method of FIG. 2, a target computer boots independent of a target storage device (step 200). The target computer then exposes the target storage device to a restoring computer (step 202). The restoring computer then connects with the target storage device via the target computer (step 204) and performs a block-level restore of a block-level backup onto the target storage device (step 206).

Referring now to FIG. 3, block diagram 300 illustrates an exemplary hardware implementation of a computing system in accordance with which one or more components/methodologies of the invention (e.g., components/methodologies described in the context of the drawing figures shown and described herein) may be implemented, according to an embodiment of the invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A system for performing a bare-metal restore, the system comprising:
    a target storage device;
    and a target computer configured to boot independently of said target storage device, expose said target storage device to a restoring computer in response to said target computer booting, and act as a conduit for said restoring computer to perform a bare-metal restore of backup data onto said target storage device.

2. The system of claim 1 wherein said target computer is configured to act as said conduit for said restoring computer to perform block-level writes of said backup data onto said target storage device.

3. The system of claim 1 wherein said target computer is configured to act as said conduit wherein said restoring computer communicates with said target computer via a computer network.

4. The system of claim 1 wherein said target computer is configured to boot using a "Live CD" or a "Live USB Flash Drive" that contains an operating system that is configured to run on a computer lacking mutable secondary storage.

5. The system of claim 1 wherein said target computer is configured to employ iSCSI initiator software to expose said target storage device to said restoring computer by designating said target storage device as an iSCSI target.

6. The system of claim 1 wherein, said target computer is configured to provide to said restoring computer a Logical Unit Number (LUN) that identifies said target storage device.

7. A method for performing a bare-metal restore, the method comprising:
    booting a target computer independently of a target storage device;
    exposing said target storage device to a restoring computer in response to said target computer booting;
    and causing said target computer to act as a conduit for said restoring computer to perform a bare-metal restore of backup data onto said target storage device.

8. The method of claim 7 wherein said causing comprises causing said target computer to act as said conduit for said restoring computer to perform block-level writes of said backup data onto said target storage device.

9. The method of claim 7 wherein said causing comprises causing said target computer to act as said conduit wherein said restoring computer communicates with said target computer via a computer network.

10. The method of claim 7 wherein said booting comprise hooting said target computer using a "Live CD" or a "Live USB Flash Drive" that contains an operating system that is configured to run on a computer lacking mutable secondary storage.

11. The method of claim 7 wherein said exposing comprises employing iSCSI initiator software to expose said target storage device to said restoring computer by designating said target storage device as an iSCSI target.

12. The method of claim 7 wherein said exposing comprises providing to said restoring computer a Logical Unit Number (LUN) that identifies said target storage device.

13. A computer program product for performing a bare-metal restore, the computer program product comprising:
    a non-transitory computer-readable storage-medium; and
    computer-readable program code embodied in said computer-readable storage medium, wherein said computer-readable program code is configured to boot a target computer independently of a target storage device, expose said target storage device to a restoring computer in response to said target computer hooting, and cause said target computer to act as a conduit for said restoring computer to perform a bare-metal restore of backup data onto said target storage device.

14. The computer program product of claim 13 wherein said computer-readable program code is configured to cause said target computer to act as said conduit for said restating computer to perform block-level writes of said backup data onto said target storage device.

15. The computer program product of claim 13 wherein said computer-readable program code is configured to cause said target computer to act as said conduit wherein said restoring computer communicates with said target computer via a computer network.

16. The computer program product of claim 13 wherein said computer-readable storage medium is a "Live CD" or a "Live USB Flash Drive" that contains an operating system that is configured to run on a computer lacking mutable secondary storage.

17. The computer program product of claim 13 wherein said computer-readable program code is configured to provide to said restoring computer a Logical Unit Number (LUN) that identifies said target storage device.

* * * * *